United States Patent
Falk et al.

(10) Patent No.: US 9,204,305 B2
(45) Date of Patent: Dec. 1, 2015

(54) METHOD FOR TRANSMITTING DATA IN A SENSOR NETWORK, SENSOR NODE AND CENTRAL PROCESSOR

(75) Inventors: Rainer Falk, Erding (DE); Hans-Joachim Hof, Ingolstadt (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 749 days.

(21) Appl. No.: 13/392,823

(22) PCT Filed: Jul. 19, 2010

(86) PCT No.: PCT/EP2010/060393
§ 371 (c)(1),
(2), (4) Date: Feb. 27, 2012

(87) PCT Pub. No.: WO2011/023461
PCT Pub. Date: Mar. 3, 2011

(65) Prior Publication Data
US 2012/0158903 A1    Jun. 21, 2012

(30) Foreign Application Priority Data

Aug. 27, 2009 (DE) .......................... 10 2009 039 097

(51) Int. Cl.
*G06F 15/173* (2006.01)
*H04W 12/10* (2009.01)
*H04L 29/06* (2006.01)
(Continued)

(52) U.S. Cl.
CPC ............. *H04W 12/10* (2013.01); *H04L 63/123* (2013.01); *H04L 67/12* (2013.01); *H04W 84/20* (2013.01)

(58) Field of Classification Search
CPC ....................................................... G06F 15/16
USPC .................................................. 709/217, 225
See application file for complete search history.

(56) References Cited

U.S. PATENT DOCUMENTS

| 2003/0226007 A1* | 12/2003 | Olson et al. .................... 713/150 |
| 2008/0225836 A1* | 9/2008 | Fuhrmann ...................... 370/352 |
| 2009/0029672 A1* | 1/2009 | Manz ........................... 455/404.2 |

FOREIGN PATENT DOCUMENTS

DE    102008007696    8/2009    ............. H04L 12/28

OTHER PUBLICATIONS

Blass, Erik-Oliver, et al., "An Energy-Efficient and Reliable Mechanism for Data Transport in Wireless Sensor Networks", Networked Sensing Systems, pp. 252-259, Jun. 8, 2007.

(Continued)

*Primary Examiner* — David Lazaro
*Assistant Examiner* — Marie Georges Henry
(74) *Attorney, Agent, or Firm* — Slayden Grubert Beard PLLC (57) ABSTRACT

A method for transmitting data in a sensor network, which comprises at least one sensor node and a central processor, is provided. The at least one sensor node repeatedly transmits a status message comprising at least one unique identifier associated with the sensor node and a data value determined by the sensor node to the central processor. Furthermore, at least one secure value range message is provided to the central processor for the at least one sensor node, which message is valid for a particular time span and comprises at least bounds for valid data values. The value contained in the status message is further processed by the central processor only if the data value is within the bounds indicated in the value range message.

20 Claims, 10 Drawing Sheets (51) Int. Cl.
*H04W 84/20* (2009.01)
*H04L 29/08* (2006.01)

(56) References Cited

OTHER PUBLICATIONS

Mili, F., et al., "Economic-based vs. Nature-inspired Intruder Detection in Sensor Networks", Third International Conference on Risks and Security of Internet and Systems, pp. 177-184, Oct. 28, 2008.

German Office Action, German Patent Application No. 10 2009 039 097.9-31, 3 pages, Mar. 16, 2010.
International PCT Search Report and Written Opinion, PCT/EP2010/060393, 12 pages, Nov. 16, 2010.
IEEE Standard for Information Technology—Telecommunications and Information Exchange Between Systems—Local and Metropolitan Area Networks—Specific Requirements, Part 15.4: Wireless Medium Access Control (MAC) and Physical Layer (PHY) Specifications for Low-Rate Wireless Personal Area Networks (WPANs); IEEE Computer Society, Sponsored by the LAN/MAN Standards Committee; 323 pages, Sep. 8, 2006.

\* cited by examiner

| C-ID | Mess | Sig |

METHOD FOR TRANSMITTING DATA IN A SENSOR NETWORK, SENSOR NODE AND CENTRAL PROCESSOR

CROSS-REFERENCE TO RELATED APPLICATIONS

This application is a U.S. National Stage Application of International Application No. PCT/EP2010/060393 filed Jul. 19, 2010, which designates the United States of America, and claims priority to DE Patent Application No. 10 2009 039 097.9 filed Aug. 27, 2009. The contents of which are hereby incorporated by reference in their entirety.

TECHNICAL FIELD

The present disclosure relates to a method for transmitting data in a sensor network, which may include at least one sensor node and a central processor. The disclosure further relates to a sensor node of a sensor network as well as a central processor of a sensor network, and also a computer program product.

BACKGROUND

Figure 1:
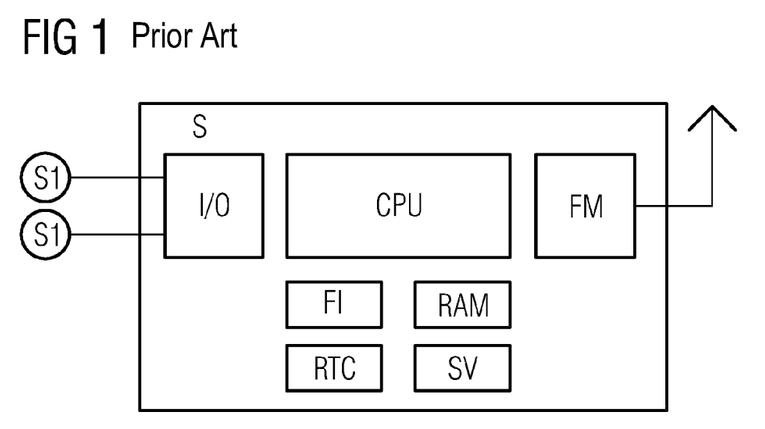
FIG. 1 shows a schematic representation of a conventional sensor node.

Sensor nodes of an in particular wireless sensor may network provide measurement data and status messages via a wireless interface. A typical structure of a conventional sensor node of a wireless sensor network is shown by way of example in FIG. 1. The sensor node S has a control processor CPU, a program memory F1 and a main memory RAM. Furthermore, an input/output unit I/O is also provided, to which two sensors S1, S2 are connected by way of example. The sensors S1, S2 can be temperature and pressure sensors for instance. Status messages are sent to a central processor GW by means of a radio module FM, which is embodied for instance in accordance with the IEEE 802.15.4 standard, Zigbee, GSM or UMTS. Furthermore, the sensor node has a battery-operated power supply SV, provided the sensor node is a node of a wireless sensor network.

Figure 2:
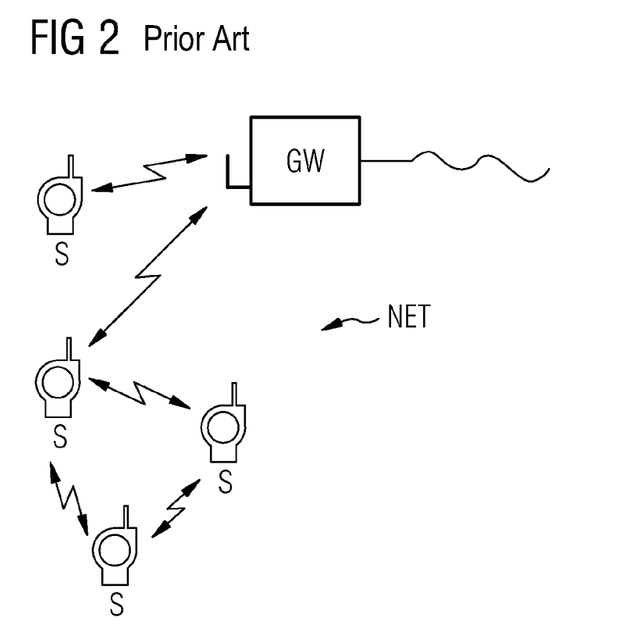
FIG. 2 shows a schematic representation of a conventional sensor network.

FIG. 2 shows a schematic representation of an exemplary conventional sensor network NET, which has several wirelessly communicating sensor nodes S and a central processor GW, typically a gateway. The central processor GW is connected to an infrastructure network, for instance the Internet. Such a sensor network NET is used for instance to monitor a large area, e.g. to monitor the air contamination in a town or to monitor the soil moisture in an agricultural cultivated area. Several sensors can also be used in a building for climate control or as a fire alarm or for burglary protection. The transmission of measurement and/or status data to the central processor GW can take place, depending on the topology of the sensor network, directly or through the medium of one or several sensor nodes, which forward a data packet from a sending node in the direction of the central processor.

A sensor network within the meaning of the disclosure may also be formed by vehicles within the scope of a car-2-car communication. With this, the vehicles may exchange messages with one another. In these messages they inform one another of their actual location, their speed and direction of travel so that congestion or an imminent collision can be identified. Similarly, information relating to the state of the road surface, such as for instance slippery conditions, can be identified and communicated to other vehicles. Fixed stations, so-called Road Side Units, can be included in vehicle communication. A status message within the scope of a car-2-car communication contains an identity of the vehicle sending the status message (e.g. a pseudonym assigned to the vehicle), a sending point in time, data relating to the sender (location, speed, direction, acceleration) and the data value. The data value is represented for instance by an item of information relating to the state of the road surface. Basically, the data value can be represented by a placeholder if only status relating to the current location and journey data is to be transmitted to the central processor. The status message is protected by a cryptographic check sum, e.g. a digital signature. The certificate and/or certificate chain needed to check the signature can likewise be contained in the status message.

Irrespective of the type of data transmitted from the sensor node to the central processor GW, such as measurement data and/or status messages, the messages transmitted by the sensor nodes are subsequently referred to as status messages in this description.

Transmitted status messages in a sensor network can be easily manipulated by an attacker. For instance an attacker can transmit manipulated data into the sensor network. Cryptographic protection methods are therefore used in order to identify manipulated data and thus be able to prevent its use. In this context, it is known to protect individual status messages, which contain measured values for instance, against manipulation by means of a cryptographic check sum in each instance.

Figure 3:
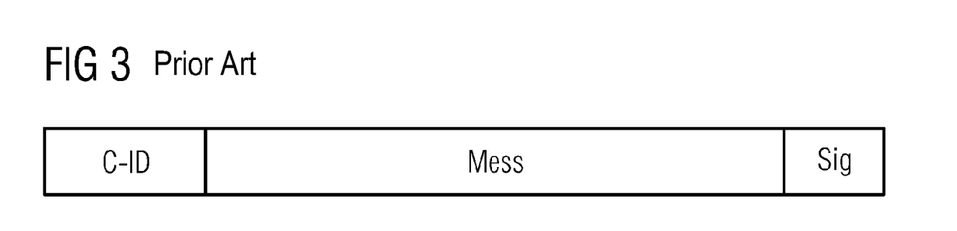
FIG. 3 shows a schematic representation of a status message used in a conventional system, which is transmitted from a sensor node to a central processor of the sensor network.

A conventional status message transmitted from the sensor node S to the central processor GW takes the form shown in FIG. 3 for instance. The status message M includes a unique identifier C-ID, which reproduces the identity of the transmitting node. For instance, the unique identifier can represent a MAC address. Furthermore, the status message M includes a data value Mess, which can contain measurement data and/or status information. Measurement data may be for instance temperature, air pressure, air humidity and suchlike. In order to protect the status message, a check sum Sig is also contained here, which can be formed for instance by a digital signature or a message authentication code. The determination of the check sum Sig is needed for each status message M. The determination of the check sum Sig may be relatively complicated depending on the cryptographic methods used and may require a large amount of energy, which is particularly significant in the case of battery-operated sensor nodes.

Figure 4:
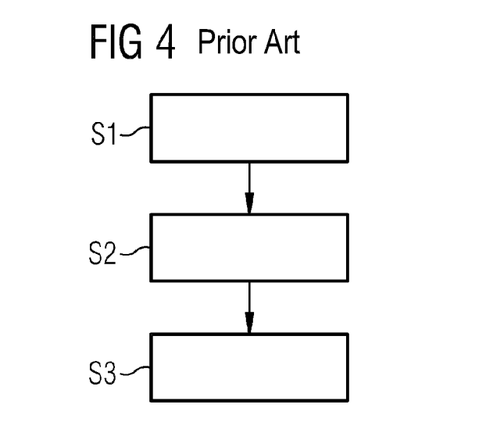
FIG. 4 shows method steps when sending a status message according to a conventional system.

FIG. 4 shows a conventional process flow to create and transmit the status message M to the central processor GW. In a first step S1, the data value is determined. In a step S2, the check sum Sig is determined. In the third step S3, the status message, including the data value Mess and the check sum Sig, is transmitted from the sensor node S to the central processor GW. The transmission can herewith also take place through the medium of or interconnection of several other sensor nodes, as is understandable for a person skilled in the art.

Figure 5:
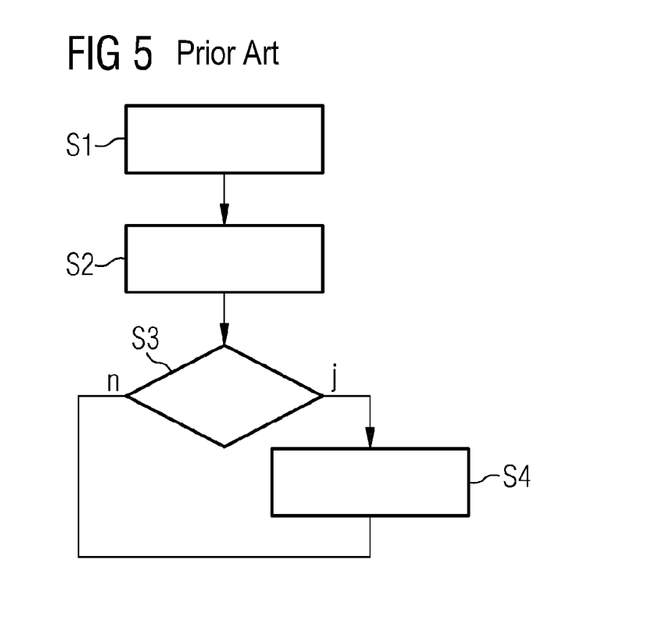
FIG. 5 shows method steps when receiving a status message by the central processor according to a conventional system.

FIG. 5 shows a conventional process flow on receipt of the status message by the central processor GW. In a first step S1, the status message M is received by the central processor from the sensor node which has created this, or a communicating sensor node. In a second step S2, the check sum Sig, which is contained in the status message, is checked. In step S3, a check is carried out to determine whether the check sum Sig, which is contained in the data message M, is correct. If this is the case ("j"), then the data is processed in step S4 by the central processor. If in step 3 the check of the check sum takes place determining that this is not correct ("n"), then the data value Mess is rejected and not processed by the central processor GW. A non-compliance of the check sum in the status message M and the determined check sum by the central processor GW indicates a manipulation of the status message M.

Aside from the protection of transmitted status messages from manipulation, a mode of operation of the sensor node, which is efficient in terms of energy consumption, is indispensable in sensor networks on account of their long periods of operation, since these are typically supplied with energy by a battery.

In this context it is known to estimate expected measured values by means of prediction in order to reduce the data traffic in sensor networks and to transmit the deviation from the estimated value. The quantity of data to be transmitted can herewith be reduced. In order to reduce the quantity of data, it is also known to only then transmit a measured value if it fulfils a specific criterion, e.g. exceeds or fails to meet a threshold value.

The use of cryptographic hash chains and their use for validity checks of digital certificates have also already been proposed.

SUMMARY

In one embodiment, a method for transmitting data in a sensor network, including at least one sensor node and a central processor, includes: the at least one sensor node repeatedly transmitting a status message to the central processor, which includes at least one unique identifier assigned to the sensor node and a data value determined by the sensor node; providing at least one protected value range message to the central processor for the at least one sensor node, said value range message being valid for a respective time period and including at least bounds for valid data values; and the central processor further processing the value contained in a status message only if the data value lies within the bounds specified in the value range message.

In a further embodiment, a respective sensor node creates at least one protected values range message itself and transmits it to the central processor. In a further embodiment, the value range message includes a check sum. In a further embodiment, the status message does not include a check sum. In a further embodiment, the status message includes a check sum.

In a further embodiment, the bounds of the value range message are specified by an upper limit and a lower limit. In a further embodiment, the bounds of the value range message are specified by a reference value and a one or two-sided tolerance value. In a further embodiment, the bounds of the value range message are specified by a time-dependent prediction function and a tolerance. In a further embodiment, the bounds of the value range message and/or the time period of the validity of the bounds are adjusted as a function of at least one predetermined parameter. In a further embodiment, the predetermined parameter includes: a temporal change in speed of the data value; and/or one or several statistical values to detect the scattering of the data value; and/or a charge state of an energy memory of the sensor node; and/or a frequency with which the status messages are transmitted to the central processor. In a further embodiment, the at least one sensor node and the central processor are synchronized with respect to one another. In a further embodiment, the value range message is regularly repeatedly transmitted from the at least one sensor node to the central processor. In a further embodiment, the value range message is transmitted from the at least one sensor node to the central processor on request from the central processor. In a further embodiment, the value range message, in particular the check sum of the value range message, includes an anchor value and, optionally, the length of a hash chain. In a further embodiment, several value range messages are provided for a respective sensor node, whereby the several value range messages each include different bounds and a different anchor value of a respectively different hash chain in each instance. In a further embodiment, the data of several value range messages is combined in a super value range message, whereby the super value range message includes a check sum. In a further embodiment, the bounds of the several value range messages are free or overlap or overlap.

In another embodiment, a computer program product, which can be charged directly into the internal memory of a digital computer and includes software code segments, can be executed to provide any or all of the following method steps or functions discussed above.

In another embodiment, a sensor node for use in a sensor network for implementing can be any or all of the following method steps or functions discussed above, the sensor node being set up to repeatedly transmit a status message to the central processor, which includes at least one unique identifier assigned to the sensor node and a data value determined by the sensor node, and to provide at least one protected value range message to the central processor for the at least one sensor node, said value range message being valid for a respective time period and including at least the bounds for valid data values.

In another embodiment, a central processor for use in a sensor network for implementing can be any or all of the following method steps or functions discussed above, the central processor being set up to repeatedly receive a status message from at least one sensor node, which includes at least one unique identifier assigned to the sensor node and a data value determined by the sensor node; to receive at least one protected value range message for the at least one sensor node, which is valid for a respective time period and includes at least bounds for valid data values; and to only then further process the value contained in a status message if the data value lies within the bounds specified in the value range message.

BRIEF DESCRIPTION OF THE DRAWINGS

Example embodiments will be explained in more detail below with reference to figures, in which.

DETAILED DESCRIPTION

Some embodiments provide a method for the energy-efficient transmission of data in a sensor network which is protected against manipulation. A sensor node and a central processor of a sensor network that allow for an energy-efficient operation of the sensor network and a manipulation-secure transmission of status messages may also be provided, as well as a corresponding computer program product.

Some embodiment provide a method for transmitting data in a sensor network, which includes at least one sensor node and a central processor. In such embodiments, the at least one sensor node repeatedly transmits a status message to the central processor, which includes at least one unique identifier assigned to the sensor node and a data value determined by the sensor node. Furthermore, at least one protected value range message is also provided to the central processor for the at least one sensor node, said value range message being valid for a respective time period and at least including bounds for valid data values. The central processor only then further processes the value contained in a status message if the data value lies within the bounds specified in the value range message.

A data value may include measurement data and/or status information. Measurement data is for instance temperature, air, air humidity, fine dust and suchlike. Measurement data may also exist as a bivalent value ("on" or "off"), e.g. in order to indicate the status of an alarm loop, of a window or a door (open or closed). Measurement data can also be entered by a user, e.g. a temperature value, which is transmitted to a temperature regulator as a target value for instance, or a control command for opening or closing a blind or for switching lighting on or off.

Status information relates to an operating status of the sensor node, e.g., to its battery status, processor load or available memory.

The term validity of a value range message is understood in the present description to mean a timespan from a first point in time to a second point in time. For instance, the value range message may also be valid for a period of five minutes or half an hour or suchlike.

Some embodiments provide the feature of not protecting each individual message which contains data values by means of a cryptographic check sum. Instead, a protected, temporally limited valid data structure, which is referred to as value range message, is provided which restricts valid data values of the sensor node for a specific period.

The idea underlying this procedure is that with a sensor node, for instance measured values at least during normal operation, it can be easily predicted if the measured physical variable only changes slowly and/or predictably. This may be used for an efficient cryptographic protection by a temporally limited valid value range message being provided for the sensor node.

Methods disclosed herein can be used both for wireless and also wired sensor networks. Particular advantages may result then if a sensor node wirelessly provides a data message to the central processor.

In some embodiments, each individual data message need not be protected cryptographically or using a compute-intensive method. On the one hand this may save on computing power of the sensor node and may also reduce its energy consumption. The processing time of status messages may also be reduced, which may increase the performance of applications in a sensor network. Furthermore, the method may enable the use of cryptographic algorithms, which, despite their complexity, typically cannot be used for the protection of each individual status message. A further advantage may consist in the manipulation possibilities being restricted for an attacker, since they can only introduce manipulated measured values into the sensor network in a limited area.

A respective sensor node may expediently create the at least one protected value range message itself and transmits this to the central processor. It may be particularly advantageous here if the value range message includes a check sum, as a result of which the value range message is protected from manipulation. The check sum may be formed for instance by a digital signature or a message authentication code. HMAC-SHA 256 with a 128 bit key or a digital RSA signature with 1024 bits or 2048 bits key length, a digital signature based on elliptical curves (ECDSA with a key length of 164 bits) can be used for instance.

Some embodiments may enable the status message not to include a check sum. The check sum can optionally be omitted only in the case of individual measured values or even with all status messages which are transmitted from the sensor node to the central processor. In particular, no cryptographic check sum may exist, which is calculated by using a cryptographic key. It is likewise possible for only an error protection check sum which is efficient to calculate, e.g., a CRC code, to exist as a check sum which is does not protect against manipulations. If particularly strong protection is needed, the status message can also include a check sum in an alternative embodiment. This can in particular be used to extend a cryptographic strongly protected value range message, whereby an energy-efficient cryptographic check sum which is easy to calculate is preferably used depending on a status message. The check sum of the status message may be for instance a HMAC-MD 5-32 check sum which is shortened to a 32-bit length, which is calculated with a 40 bit key. The check sum of the status message can also be protected with a network key, i.e. with a key which is not individual to a sensor node and thus also known to further sensor nodes.

According to a further embodiment, the bounds of the value range message may be specified by an upper limit and a lower limit. Alternatively the bounds of the value range message can be specified by a reference value and a one or two-sided tolerance value. In a further alternative, the bounds of the value range message may be specified by a time-dependent prediction function and a tolerance.

According to a further embodiment, the bounds of the value range message and/or the time period of the validity of the bounds may be adjusted as a function of at least one predetermined parameter. The predetermined parameter may include, in accordance with a development, a temporal change in speed of the data value and/or
one or several statistical values to detect the control of the data value and/or
a charge state of an energy memory of the sensor node and/or
a frequency with which the status messages are transmitted to the central processor.

A further advantageous embodiment may provide for the at least one sensor node and the central processor to be synchronized temporally with respect to one another. A time reference may be expedient for the sending and receiving of status messages. To this end, the real time, i.e., the absolute time of day, can be used. This can be obtained by way of a GPS receiver or a DCF77 receiver (so-called time signal transmitter) for instance. Alternatively, a local time information of the sensor node can also be used, since only the difference between current time and the presentation point in time of the value range message have to be known. A synchronization of a receiver to the virtual node time of the sensor may then be needed. This may be possible for instance with the use of a hash chain, as provided in a further embodiment. The sensor node herewith responds to a message (so-called Challenge) with a hash value H(next_hash c). Provided neither the value next_hash nor the value of the next element of the hash chain were published, apart from the sensor node, no other sensor node can calculate the response. A check can only be carried out by the central processor, once the sensor node publishes the next value of the hash chain (next_hash). This supported synchronization is known by the protocol µTesla.

In a further embodiment, the value range message may be regularly periodically transmitted from the at least one sensor node to the central processor. Alternatively, the value range message may be transmitted from the at least one sensor node to the central processor upon request from the central processor.

According to a further advantageous embodiment, the value range message, in particular the check sum of the value range message, may include an anchor value and optionally the length of a hash chain. A further improved security against manipulation can herewith be achieved. This procedure is known accordingly for the validity check of digital certificates.

A further embodiment may provide for several value range messages to be provided for a respective sensor node, whereby the several value range messages each include different bounds and a different anchor value of a respectively different hash chain in each instance. Depending on the current data value, the current value of the hash chain may publish that value range message, in the values range of which the current measured value lies. It may thus be possible to prevent a data value from "leaving" the valid value range of a value range message and a renewed transmission of an adjusted value range message is needed.

According to a further advantageous embodiment, the data of several value range messages may be combined in a super value range message, whereby the super value range message includes a check sum. According to this development, several value range messages which are protected separately by their own check sum in each instance are not generated, instead the several value range messages are combined to form a data structure (e.g. strung together) and protected mutually by a (single) cryptographic check sum.

In this context it may be expedient if the bounds of the several value range messages are free of overlaps or alternatively are arranged overlapping one another.

Some embodiments provide a computer program product that can be loaded directly into the internal memory of a digital computer and may include software code segments, with which any or all the steps or functions discussed herein may be implemented, when executed by one or more processors.

Some embodiments provide a sensor node for use in a sensor network to implement method steps to functions disclosed herein. The sensor node may be set up to repeatedly transmit a status message to the central processor, which may include at least one unique identifier assigned to the sensor node and a data value determined by the sensor node. The sensor node may also be set up to provide at least one protected value range message to the central processor for the at least one sensor node, said value range message being valid for a respective time period and including at least the bounds for valid data values.

Some embodiments provide a central processor for use in a sensor network to implement any or all of the method steps or functions discussed herein. The central processor may be set up to repeatedly receive a status message from at least one sensor node, said status message including at least one unique identifier assigned to the sensor node and a data value determined by the sensor node. The central processor may also be set up to receive at least one protected value range message for the at least one sensor node, which is valid for a respective time period and includes at least bounds for valid data values. The central processor may be set up to only process the value contained in a status message if the data value lies within the bounds specified in the value range message.

FIGS. 1 to 5, which illustrate conventional procedures for transmitting data in a sensor network NET with at least one sensor node S and a central processor GW, were explained above in the Background section. Certain embodiments of the present invention build on this procedure and develop it advantageously.

To provide an energy-efficient operation of the sensor node S for its long period of operation as well as high protection against manipulation of the transmitted status messages M from an attacker, some embodiments include transmitting at least one protected value range message WBS to the central processor GW in addition to the status messages which are repeatedly transmitted from a sensor node S to the central processor GW. The protected value range message WBS is preferably created by the sensor node transmitting the status messages M to the central processor GW. The protected value range message WBS is valid for a respective time period and includes at least bounds for valid data values. The value contained in a status message is then only further processed by the central processor GW if the data value lies within the bounds specified in the value range message.

One possible advantage of this procedure consists in a cryptographic protection not having to be generated separately for each individual status message (and thus each individual data value). Processing power may be saved in the sensor node. The energy consumption of the sensor node S may be reduced. In particular, the processing time of messages may also be reduced, as a result of which the performance of sensor network applications may increase. For the value range message WBS, complex cryptographic algorithms can conversely be used which, on account of their complexity, cannot be used to protect each individual status message. Furthermore, manipulation possibilities for an attacker may be restricted since they are only able to "input" manipulated data values in a limited area.

According to embodiments of the method disclosed herein, data values (e.g. measured values) of a sensor may be reliably protected, whereby a reduced processing power and energy consumption may be achieved in comparison with the known procedure in order to protect each status message cryptographically in each instance. This may be achieved in that not every data value is protected in a bit-accurate fashion. Instead, in embodiments discussed herein, it may be sufficient if an attacker is only able change the data values marginally within the predetermined bounds.

This may be advantageous when protecting data values by means of a digital signature, since great processing power and thus a higher energy consumption may be needed for the signature calculation. A signature may be required if in principle any previously unknown receiver is to be able to check the validity of the data value. The method may thus be suited to public sensor nodes or vehicle networks for instance.

The method may also be efficient for data values, which naturally contain significant redundancy. For instance, the temperature frequently only changes slowly and lies in a relatively small value range.

It may also not be necessary to protect each transmitted status message. It may be adequate to know that the currently measured value still lies within a certain range, which is predetermined by the bounds in the value range message. An extremely efficient protection may however be achieved.

Some embodiments of the method may further reduce or optimize the processing time of status messages, since complicated cryptographic operations no longer have to be implemented for each message. The method may also enable the use of strong cryptographic methods, which, on account of their processing power requirement, cannot be used for the protection of individual status messages.

Figure 6:
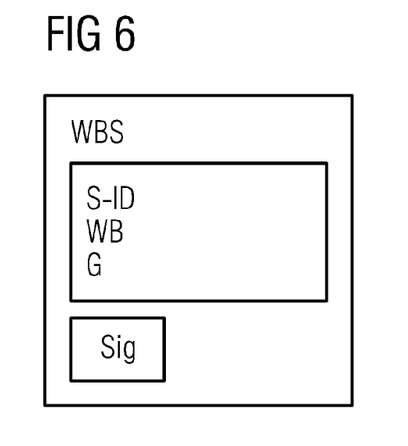
FIG. 6 shows an example value range message in a schematic representation, according to an embodiment of the present disclosure.

FIG. 6 shows a schematic representation of a value range message WBS, according to an example embodiment. This may include a unique identifier S-ID, a value range specification WB and a validity specification G. Furthermore, the value range message WBS may be protected by a cryptographic check sum Sig.

Figure 7:
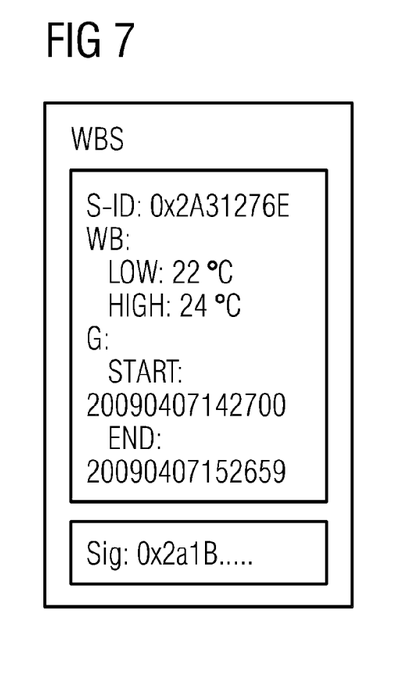
FIG. 7 shows an exemplary representation of a value range message, according to an embodiment of the present disclosure.

FIG. 7 shows a concrete example of a value range message WBS. The unique identifier S-ID of the value range message WBS reads "0x2A31276E", according to an example embodiment. A temperature between 22° C. (LOW: lower value) and 24° C. (HIGH: upper value) is specified as a confirmed value range WB. The temporal validity G may be specified as a starting time and an end time in the format YYYYMMDDHHMMSS, whereby YYY represents the year, MM represents the month, DD represents the day, HH represents the hour, MM represents the minute and SS represents the seconds. This means that the value range message WBS is valid from 07.04.2009, 14:27:00 to 07.04.2009, 15:26:59.

The value of the cryptographic check sum Sig is only indicated. Here this may be a value which is calculated by means of a known method, e.g. HMAC-SHA1, AES-CBC-MAC, RSA-signature, DSA signature, ECDSA signature and suchlike, for calculating a cryptographic check sum.

Alternatively the value range WB could also be specified as a reference value and a tolerance (e.g. the maximum allowed absolute or percentual deviation from the reference value). The temporal validity can be specified for instance also by a starting value and a duration.

A current value range message may be expediently not only transmitted from the sensor node to the central processor GW following its generation. It may be advantageous to transmit the current value range message WBS repeatedly, e.g. each minute, to the central processor. In a further embodiment, the current value range message could also be transmitted again from the corresponding sensor node upon request from the central processor GW.

Figure 8:
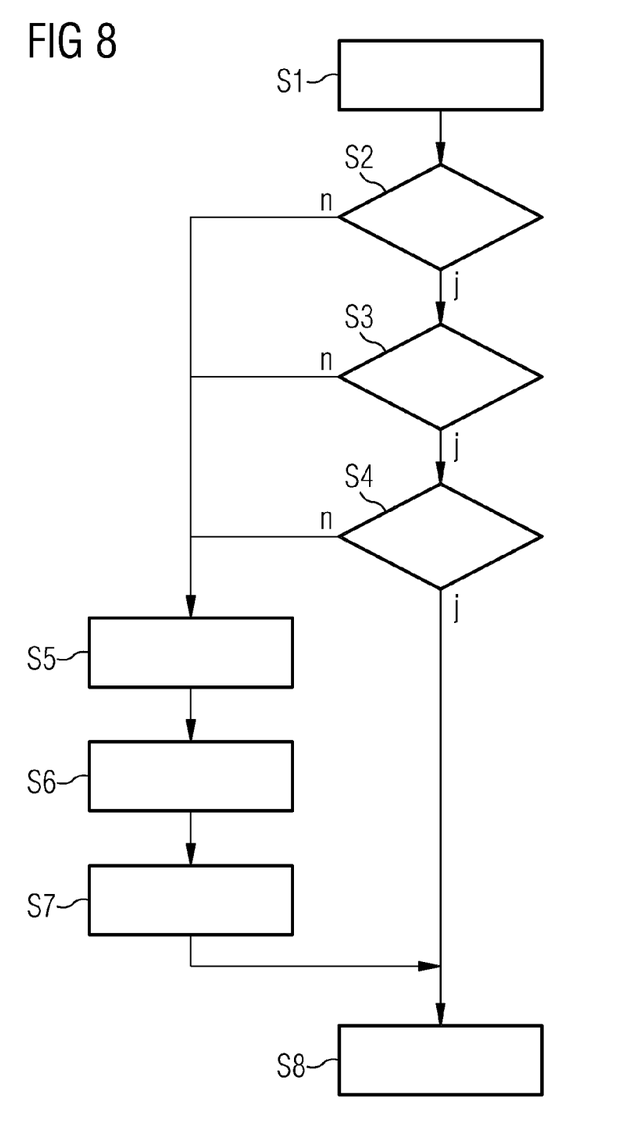
FIG. 8 shows example method steps when sending a status message through a sensor node, according to an embodiment of the present disclosure.

FIG. 8 shows an example process flow of a method when sending a status message to the central processor GW, according to an example embodiment. In a first step S1, a data value may be determined by the sensor node. In step S2, a check is carried out to determine whether a value range message WBS exists for the sensor node. If this is not the case ("n"), then a new value range message WBS may be determined in step S5. This includes, as explained, a value range specification and a validity specification G. In step S6, the cryptographic check sum may be determined for the value range message. In step S7, the created value range message including the cryptographic check sum Sig may be transmitted to the central processor. In step S8, the status message including the data value determined in step 1 may then be transmitted to the central processor GW.

If the value range message WBS exists ("j") for the sensor node S in step S2, a check may be carried out in step S3 to determine whether the value range message is current. This means that a check is carried out to determine whether the current time lies within the validity specification G of the current value range message WBS. If this is not the case ("n"), then the steps S5, S6 and S7 may be run first. If the value range message WBS is by contrast current in step S3 ("j"), a check may be carried out in step S4 to determine whether a measured value lies in the range WB confirmed by the value range message WBS. If this is the case ("j"), the status message including the data value may be transmitted in step S8 to the central processor GW. If the data value lies outside of the value range ("n") defined by the value range message, then the steps S5, S6 and S7 may be run, whereby the status message is not transmitted to the central processor.

Figure 9:
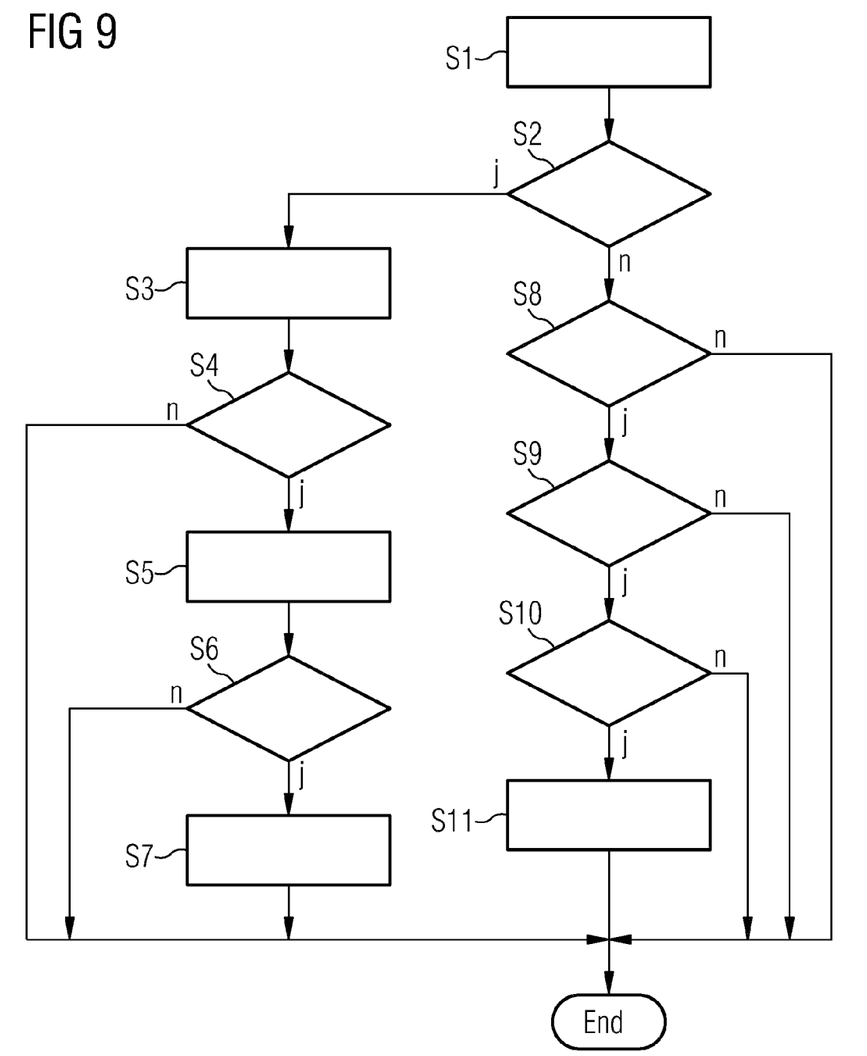
FIG. 9 shows example method steps when receiving a status message through a central processor of the sensor network, according to an embodiment of the present disclosure.

FIG. 9 illustrates an example process flow upon receipt of a status message M by the central processor GW, according to an example embodiment. In step S1, a status message M may be received. In step S2, a check is carried out to determine whether the received message is a value range message WBS. If this is the case ("j"), then the cryptographic check sum of the value range message WBS may be checked in step S3. In step S4, its validity is checked. If this is not valid ("n"), then the method ends at this point. If the cryptographic check sum Sig of the value range message WBS is by contrast valid ("j"), then in step S5, the temporal validity of the value range message WBS may be checked. In step S6, the method ends in the event in which the temporal validity is not given ("n"). If the temporal validity is correct ("j") on the other hand, then the value range message WBS may be stored in step 7.

If it was determined in step S2 that the received message is not a value range message WBS ("n"), then a check may be carried out in S8 to determine whether it is a data value. If this is not the case, then the method ends at this point. In this case, it may be a routing message for instance. If a data value was received with the received message ("j" in step S8), then a check may be carried out in step S9 to determine whether a current value range message WBS exists for the sending sensor node S. If this is not the case ("n"), then the method ends. In this case, a value range message could be requested by the central processor GW. On the other hand if a current value range message WBS exists ("j") for the sensor node, then a check may be carried out in step S10 to determine whether the data value lies in the region confirmed by the value range message WBS. If this is the case ("j"), then the data value may be used in step S11. On the other hand ("n") ends the method and the data value is not used. In this case, an attack may have taken place.

Figure 10:
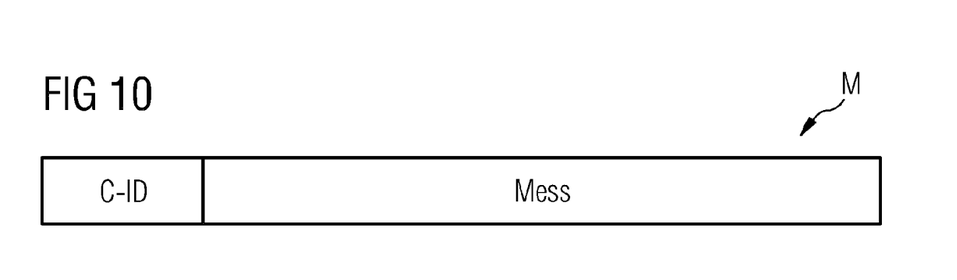
FIGS. 10 and 11 show schematic representations of an example status messages, according to an embodiment of the present disclosure.
Figure 11:
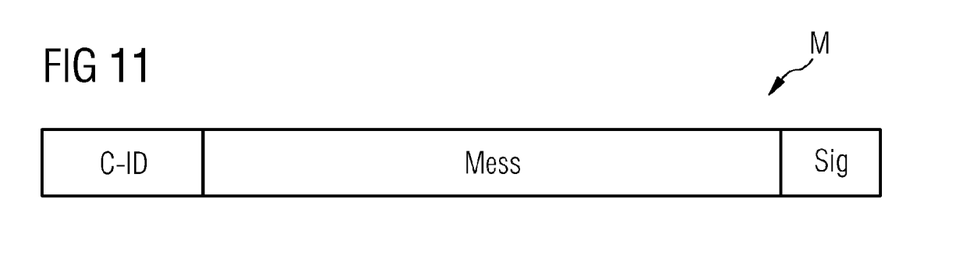

FIGS. 10 and 11 show schematic representations of an example structure of a status message M, according to an example embodiment. In the simplest variant according to FIG. 10, a status message only contains a unique identifier C-ID and the data value Mess. In contrast to status messages from the prior art, in this variant no cryptographic check sum is needed since the data value is protected by way of the value range specification and the validity of the value range message WBS. In the variant shown in FIG. 11, a cryptographic check sum Sig is also provided, which is checked in addition to the value range message. Increased security is herewith achieved.

In one development, a value range message may contain an anchor value ANCHOR of a so-called hash chain HC. This is known in validity checks by digital certificates. A hash chain of length n begins, starting from a cryptographic (pseudo-) randomly selected value R1. The values of the hash chain are not calculated based on this, so that $$R2:=H(R1), R3:=H(R2), \ldots, Rn:=H(R(n-1)).$$

Here H( ) represents a cryptographic hash function, e.g. according to MD5, SHA-1, SHA256. The last value Rn of the hash chain represents the so-called anchor, which is characterized with ANCHOR in the subsequent drawings.

One property of cryptographic hash functions is that this cannot be inverted feasibly. This means that an input value cannot be feasibly concluded from an initial value, which results in this initial value. As a result a hash chain can be easily calculated in the one direction (i.e. in index 1→2→. . . →n). A simple calculation in the opposite direction is however not possible.

These properties of hash chains are used in certain embodiments such that in a value range message WBS, the anchor value of a hash chain is also accepted. The elements of the hash chain may be assigned in each instance to a certain period of time of the overall validity duration of the value range message WBS, e.g. a second, a minute, an hour.

In some embodiments, if a sensor node S now transmits a data value Mess in a status message M at a specific point in time, then it also transmits in the status message the value of that value of the hash chain, which corresponds to the current point in time. This may confirm that the data value exists in the confirmed value range in this period. The receiver, i.e., the central processor GW, may also check, before it uses a received data value Mess, whether the corresponding value of the hash chain was made known for the current point in time.

An attacker can therefore no longer incorrectly use a value range message during its overall validity duration, but instead only provided the validity of the value range message WBS is confirmed by the sensor node S by publishing the current value of the hash chain.

Figure 12:
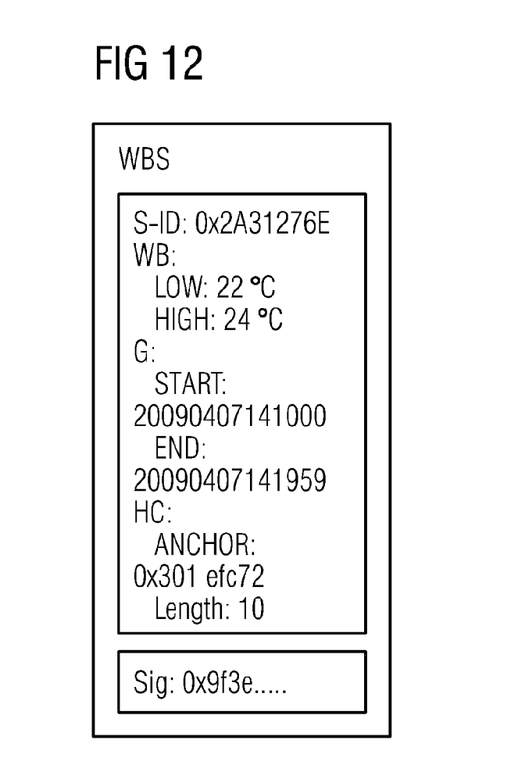
FIG. 12 shows an exemplary value range message in a modified embodiment.

An example value range message WBS with a validity duration G of ten minutes and length "length" of the hash chain HC of ten elements is shown by way of example in FIG. 12. The value range message WBS may therefore contain additional specifications relative to the hash chain HC, namely the anchor value ANCHOR and its length (length). A value of the hash chain HC may thus be assigned in each instance to a minute. Instead of the length of the hash chain, the temporal grid, i.e., the validity of each element of the hash chain HC could also be specified (here: a minute).

Figure 13:
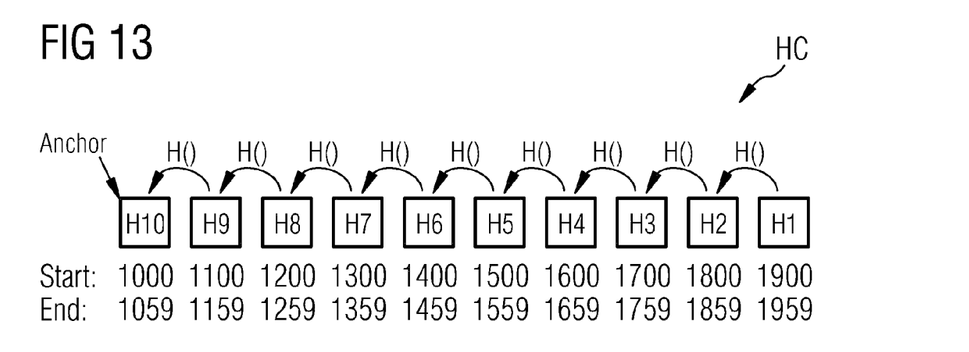
FIG. 13 shows the basic structure of a hash chain according to certain embodiments of the present disclosure.

FIG. 13 shows an example hash chain, i.e., the values which are initially calculated based on a cryptographic (pseudo-) randomly selected value H1, according to an example embodiment. The anchor value (ANCHOR) is the value H10. This is the value which is specified in the value range message WBS. A temporal range is assigned to each element of the hash chain (start, end), which is specified in abbreviated form for the representation in the format MMSS (MM minute, SS second). The value "1700" of the value H3 corresponds (in connection with the specifications of the value range message WBS from FIG. 12) in full to the time specification "20090470141700".

In one variant, the sensor node provides several value range messages, which each specify a different value range and each contain the anchor value of a respectively different hash chain. Depending on the current data value, the current value of the hash chain will publish that value range message in which value range the current measured value lies. In this way, the removal of a data value from the value range of a value range message is prevented. As a result, in some instances the new position and the transmission of an adjusted value range message is not needed.

Figure 14:
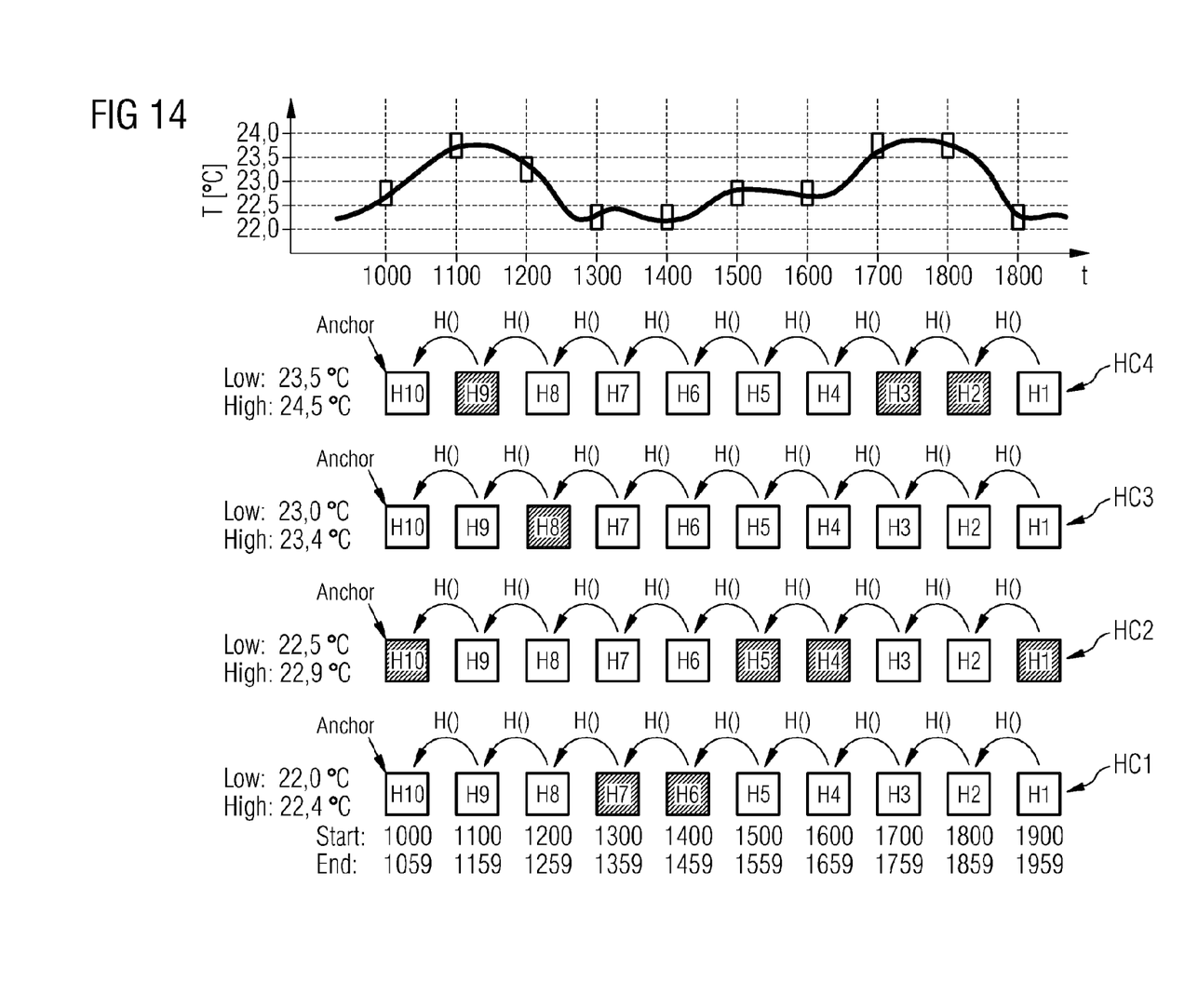
FIG. 14 shows the use of a hash chain in connection with a value range message according to an example embodiment.

An example of the procedure is shown schematically in FIG. 14 according to an example embodiment. In the topmost graphic, the course of a temperature to be measured is shown as a function of time t. Four hash chains HC1, HC2, HC3 and HC4 are shown below the temperature time response. The hash chain HC1 is herewith assigned to a temperature range of 22.0° C. to 22.4° C. The hash chain HC2 is assigned to a temperature range of 22.5° C. to 22.9° C. The hash chain HC3 is assigned to a temperature range of 23.0° C. to 23.4° C. The hash chain HC4 is assigned to a temperature range of 23.5° C. to 24.0° C. In the figure, the lower temperature value is characterized in each instance with LOW and the upper temperature value with HIGH. A data value is detected in the representation in each instance on the full minute. This is characterized in the temperature flow by the vertical lines on the full minute, whereby the representation is specified again in abbreviated form in the format MMSS (with MM minute, SS second). The current hash value of that hash chain HC1, HC2, HC3 and HC4, in the value range of which the current data value falls, is then published. The published hash value is characterized with dashes in FIG. 14. As clearly apparent from FIG. 14, the temperature at point in time "1000" lies in the range between 22.5° C. and 23° C. The hash value H10 of the hash chain HC3 is therefore published. At point in time "1100", the temperature lies in the range between 23.5° C. and 24° C. Accordingly, the hash value H9 of the hash chain HC4 is published etc.

Contrary to the description, the need to transmit the actual data value may be eliminated. In accordance with one embodiment, only the actual value of the associated hash chain still needs to be transmitted to the central processor GW.

Figure 15:
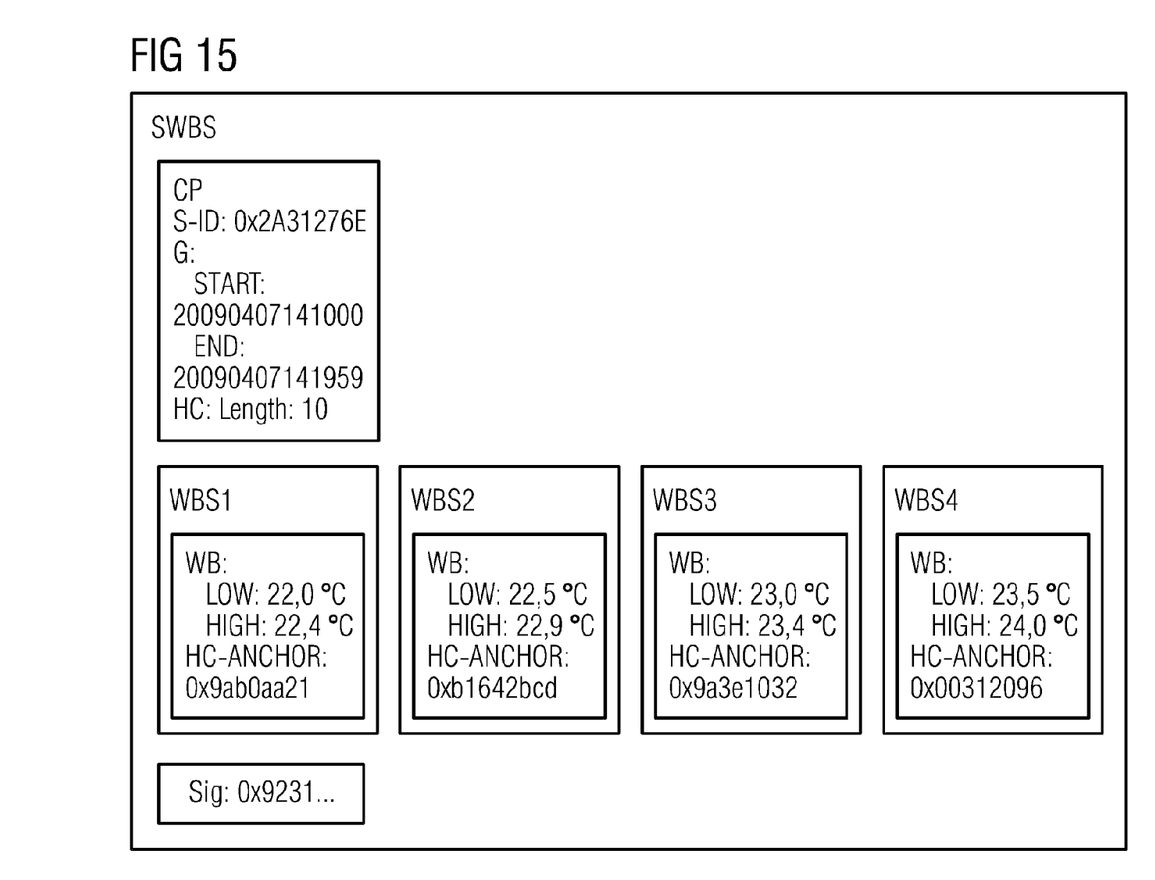
FIG. 15 shows an exemplary representation of a super value range message, according to an embodiment of the present disclosure.

Another embodiment may provide for several value range messages which are separately protected by a cryptographic check sum in each instance not to be generated, but instead the several value range messages are combined to form a data structure, e.g., strung together, and mutually protected by means of a cryptographic check sum Sig. A value range message of this type is referred to as a super value range message SWBS. This is shown by way of example in FIG. 15. The super value range message SWBS includes a shared part CP. This contains the data which is shared by the individual value range messages WBSi (with i-1 to n, here: n=4), namely the unique identifier S-ID, the validity time frame G and possibility the length of the hash chain HC length. Furthermore, several sub value range messages are contained, e.g., four: WBS1, WBS2, WBS3, WBS4. These may specify a value range WB in each instance and an optional anchor value HC-ANCHOR of the respective hash chain. The overall data structure of the super value range message SWBS may be protected by a shared digital check sum Sig.

In some embodiments, a value range defined by the bounds LOW and HIGH may be represented in each instance by a hash chain. If, as in the exemplary embodiment in FIG. 15, the value ranges of the sub value range messages WBS1, WBS2, WBS3 and WBS4 are free of overlap, a hash value may be made known precisely at each time step: the hash value of that value range in which the current measured value falls.

In one alternative, the value ranges may also be overlapping. The current hash value of all those hash chains is then published, in which the current measured value falls in the respective value range. If the current measured value does not fall in any value range, then no hash value is published.

In a further variant, a further hash chain can be provided, which represents the pseudo value range "Out of range", i.e., the current measured value does not fall into one of the existing value ranges. Two hash chains can also be provided herefor (e.g."too_HIGH" and "too_LOW") in order to distinguish whether the current measured value lies above or below the value ranges which can be shown by the existing value range messages.

Figure 16:
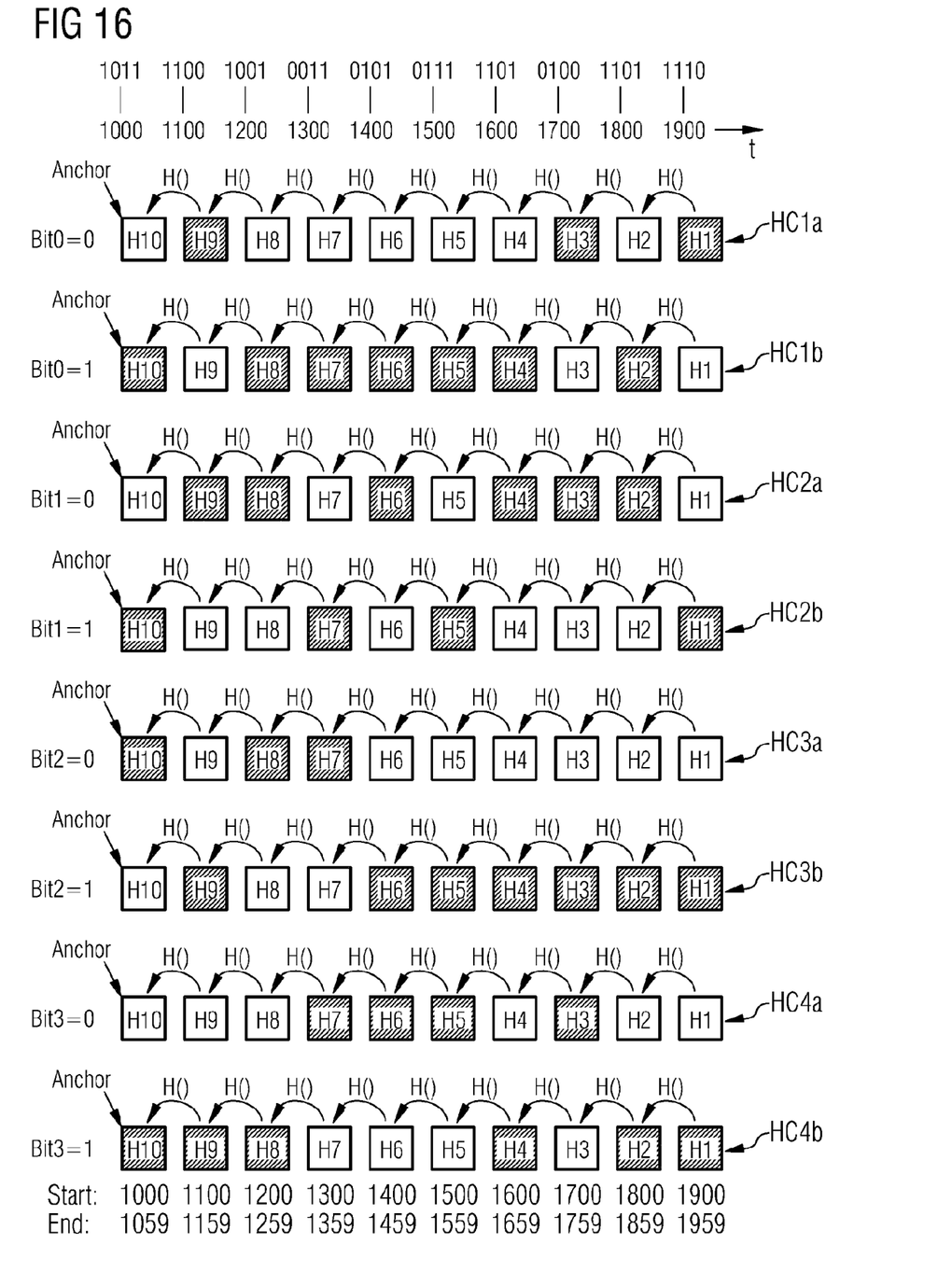
FIG. 16 shows a modified use of hash chains, in connection with a super value range message according to an embodiment of the present disclosure.

In a further embodiment variant, a data value is binary coded, e.g., as a 4 bit, 8 bit, 12 bit or 16 bit data value. Two hash chains HC1a, HC1b for a bit 0, HC2a, HC2b for a bit 1, HC3a, NC3b for a bit 2 and HC4a, HC4b for a bit 3 are then provided in each instance for each bit position for a 4 bit data vale, whereby the hash chain characterized with the index "a" represents the bit value 0 and the hash chain characterized with the index "b" represents the bit value 1. Those current hash values of those hash chains, which correspond to the current data value, are then published. This means that either the value of the hash chain is made known for each bit, which corresponds to the value 0 or the value of the hash chain, which corresponds to value 1. With a coding of for instance 4 bits per measured value, four hash values are therefore made known in each instance. This is shown by way of example in FIG. 16. At point in time t=1000, the data value is 1011 for instance, whereby the highest value bit 3 is reproduced to the left and the lowest value bit 0 is reproduced to the right.

In another variant, a sensor node does not present a value range message but instead the sensor node adds a check sum to the status message as a function of whether the data value to be sent lies within the bounds of the value range message.

What is claimed is:

1. A method for transmitting data in a sensor network including at least one sensor node and a central processor, comprising:
   the at least one sensor node repeatedly transmitting a status message to the central processor, the status message including at least one unique identifier assigned to the sensor node and a data value determined by the sensor node,
   providing at least one protected value range message to the central processor for the at least one sensor node, said at least one protected value range message being valid for a respective time period and including at least bounds for valid data values, and
   the central processor processing the data value contained in a status message only if the data value lies within the bounds specified in the value range message.

2. The method of claim 1, comprising a respective sensor node creating at least one protected values range message itself and transmitting it to the central processor.

3. The method of claim 1, wherein the value range message includes a check sum.

4. The method of claim 1, wherein the status message does not include a check sum.

5. The method of claim 1, wherein the status message includes a check sum.

6. The method of claim 1, wherein the bounds of the value range message are specified by an upper limit and a lower limit.

7. The method of claim 1, wherein the bounds of the value range message are specified by a reference value and a one or two-sided tolerance value.

8. The method of claim 1, wherein the bounds of the value range message are specified by a time-dependent prediction function and a tolerance.

9. The method of claim 1, wherein at least one of (a) the bounds of the value range message and (b) the time period of the validity of the bounds is adjusted as a function of at least one predetermined parameter.

10. The method of claim 9, wherein the predetermined parameter includes at least one of a temporal change in speed of the data value;
    one or several statistical values to detect the scattering of the data value;
    a charge state of an energy memory of the sensor node; and
    a frequency with which the status messages are transmitted to the central processor.

11. The method of claim 1, wherein the at least one sensor node and the central processor are synchronized with respect to one another.

12. The method of claim 1, wherein the value range message is regularly repeatedly transmitted from the at least one sensor node to the central processor.

13. The method of claim 1, wherein the value range message is transmitted from the at least one sensor node to the central processor on request from the central processor.

14. The method of claim 1, wherein the value range message, in particular the check sum of the value range message, includes an anchor value and, optionally, the length of a hash chain.

15. The method of claim 14, wherein several value range messages are provided for a respective sensor node, whereby the several value range messages each include different bounds and a different anchor value of a respectively different hash chain in each instance.

16. The method of claim 1, wherein the data of several value range messages is combined in a super value range message, wherein the super value range message includes a check sum.

17. The method of claim 16, wherein the bounds of the several value range messages are free or overlap.

18. A computer program product stored in non-tangible internal memory of a digital computer and including software code segments executable by a processor to:
    cause at least one sensor node repeatedly transmitting a status message to the processor, the status message including at least one unique identifier assigned to the sensor node and a data value determined by the sensor node,
    receiving at least one protected value range message for the at least one sensor node, said at least one protected value range message being valid for a respective time period and including at least bounds for valid data values, and
    processing the data value contained in a status message only if the data value lies within the bounds specified in the value range message.

19. A sensor node for use in a sensor network including a central processor, the sensor node comprising:
    a control processor;
    a memory communicatively coupled to the control processor for storing a program;

wherein the execution of the program by the control processor causes the sensor node to:

repeatedly transmit a status message to the central processor, the status message including at least one unique identifier assigned to the sensor node and a data value determined by the sensor node, and provide at least one protected value range message to the central processor for the at least one sensor node, said at least one protected value range message being valid for a respective time period and including at least the bounds for valid data values.

20. A gateway for in a sensor network including at least one sensor node, the gateway comprising:

a processor configured to:

repeatedly receive a status message from the at least one sensor node, the status message including at least one unique identifier assigned to the sensor node and a data value determined by the sensor node, receive at least one protected value range message for the at least one sensor node, wherein the at least one protected value range message is valid for a respective time period and includes at least bounds for valid data values; and further process the value contained in a status message only if the data value lies within the bounds specified in the value range message.

* * * * *